United States Patent [19]

Miyake

[11] Patent Number: 4,652,060
[45] Date of Patent: Mar. 24, 1987

[54] ANTISKID CONTROL METHOD

[75] Inventor: Katsuya Miyake, Saitama

[73] Assignee: Akebono Brake Industry Co., Ltd., Tokyo, Japan

[21] Appl. No.: 772,179

[22] Filed: Sep. 3, 1985

[30] Foreign Application Priority Data

Sep. 4, 1984 [JP] Japan .................................. 59-185096

[51] Int. Cl.$^4$ ............................................... B60T 8/84
[52] U.S. Cl. ........................................ 303/96; 303/111
[58] Field of Search .................... 303/96, 97, 110, 111, 303/119, 106; 188/181 A, 181 R

[56] References Cited

U.S. PATENT DOCUMENTS

| | | | |
|---|---|---|---|
| 3,288,232 | 11/1966 | Shepherd | 303/96 |
| 3,535,004 | 10/1970 | Howard et al. | 303/96 |
| 3,832,010 | 8/1974 | Grosseau | 303/96 |
| 3,980,346 | 9/1976 | Leiber | 188/181 A |
| 4,418,966 | 12/1983 | Hattwig | 303/111 |

FOREIGN PATENT DOCUMENTS 2614180 10/1977 Fed. Rep. of Germany ........ 303/96
2134610 8/1984 United Kingdom .

Primary Examiner—Duane A. Reger
Assistant Examiner—Alvin Oberley
Attorney, Agent, or Firm—Toren, McGeady and Goldberg

[57] ABSTRACT

In a method for antiskid control of a vehicle, the operating condition of a two-channel type antiskid control device is arranged to be shiftable according to the road surface condition, in such a manner that, in the case of a so-called split road surface condition, the braking force is maintained as much as possible on wheels which remain sufficiently in contact with the road surface, so that the brake distance can be prevented from lengthening without losing the maneuverability of the vehicle.

6 Claims, 3 Drawing Figures

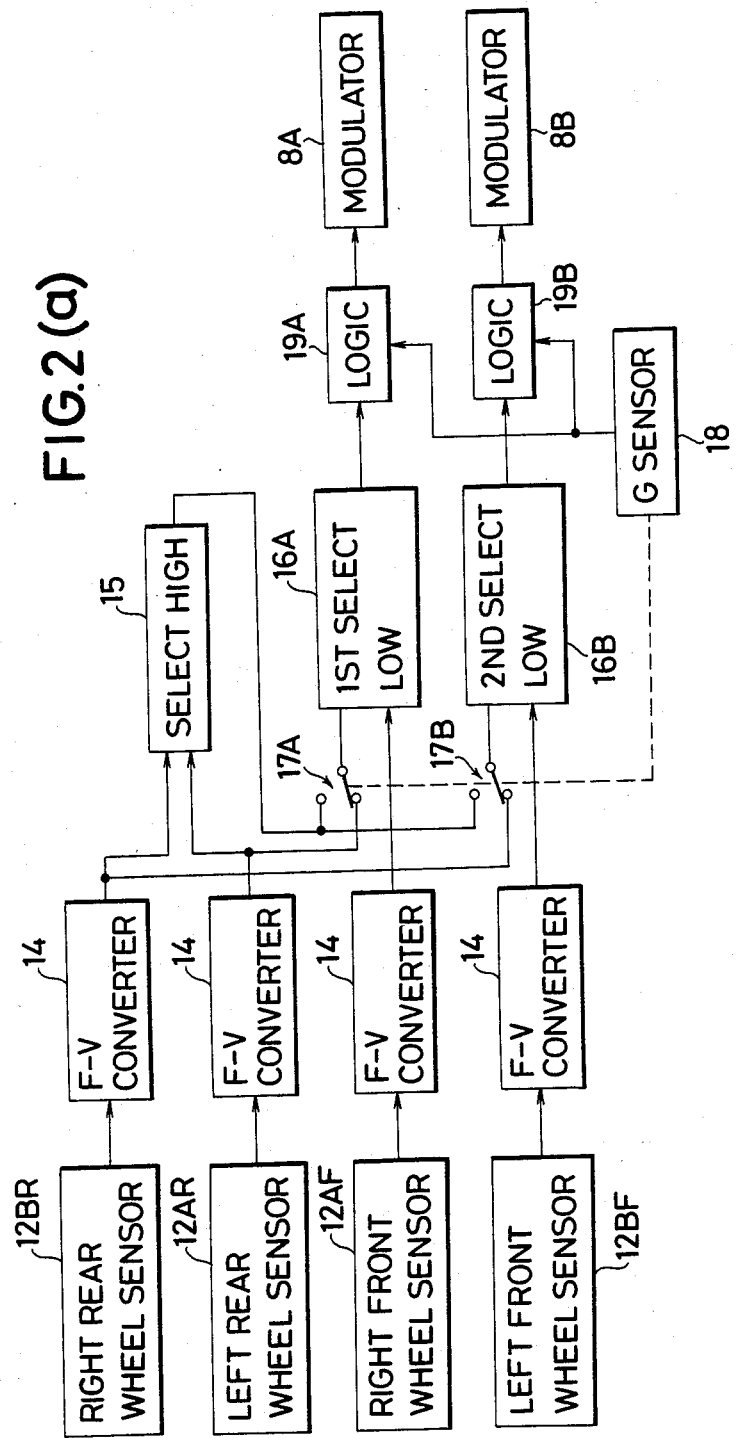

ANTISKID CONTROL METHOD

FIELD OF THE INVENTION AND RELATED ART STATEMENT

This invention relates to an antiskid control method for a four-wheeled vehicle, and more particularly, to a method suited to a simplified type antiskid control device employed in a vehicle having crossed-type brake fluid pressure piping arranged between a right front wheel and a left rear wheel and between a left front wheel and a right rear wheel of the vehicle.

Generally, it is believed ideal for a four-wheeled vehicle to have an antiskid control function arranged to be individually accomplished on the four wheels, one independently of another. However, the individual antiskid control necessitates provision of a brake fluid pressure reducing device for each of the brake fluid pressure channels for these wheels separately from each other. However, a generic application of this control arrangement presents a problem as it results in an increased number of parts, a voluminal disadvantage and an increase in cost. Meanwhile, four-wheel vehicles generally have two brake fluid pressure channels piped in an intercrossed manner. In view of this, it has been proposed to solve the above-stated problem by a two-channel type antiskid control method, wherein the pressure reducing devices are provided for the intercrossed piping channels respectively, for example, as disclosed in British Laid-Open Patent Application No. 2,134,610. Compared with the above-stated method of individually controlling the four wheels, the required number of the pressure reducing devices which consist of solenoid valves, etc. can be reduced by half in accordance with the proposed two channel control method.

In the two-channel control method, since the braking force to be applied to a rear wheel is normally smaller than the braking force to be applied to a front wheel, a reducing valve, such as a so-called proportioning valve, a deceleration sensing type valve, a limiter valve or the like, is provided in the brake fluid pressure transmission piping on the side of the rear wheel in each channel.

A further study into the two-channel control method for the above-stated cross piping arrangement reveals necessity of improvement especially in respect to prevention of a brake distance from becoming longer. Actual vehicle running road surface conditions includes, for example, a case where frozen puddles resulting from a sidewise slant of the road surface make the right-hand side wheels apt to slip over the road surface while the left-hand side wheels sufficiently remain adherent to the road surface. Such a road surface condition is generally called a split road surface condition. A vehicle running on a split road surface has the tendency to lock the right front wheel of the right front wheel - left rear wheel channel (hereinafter referred to as the first channel) which prompts the antiskid control to be performed on the first channel, while the tendency to lock the right rear wheel of the left front wheel - right rear wheel channel (hereinafter referred to as the second channel) prompts the antiskid control to be performed on the second channel. Eventually, therefore, the antiskid control is performed on all of the four wheels. As a result, the arrangement of the two-channel control method lengthens the braking distance to an unnecessary extent. Such an unnecessarily lengthened braking distance is not desirable. Therefore, it has been desired to improve it while retaining the advantageous features of the two-channel antiskid control method in terms of reduction in size and cost, etc.

Further, in the case of the above cited British Laid-Open Patent Application No. 2,134,610, as described on page 2, lines 54 to 60 of the specification of the application, when a skid signal is produced from one of rear wheels, say, a right rear wheel at a certain point of time, this signal is arranged to be ignored and only one of the modulators comes to generate a control signal when a skid signal is produced from the other (or left) rear wheel. Therefore, while the control signal disappears upon restoration of the speed of the left rear wheel, the right rear wheel still remains locked as the pressure on this wheel has not been reduced. Under this condition, the skid signal of the right rear wheel remains cancelled. Therefore, even if a skid signal is again produced under this condition with the left rear wheel again coming to be locked, the skid signal would be ignored. In that event, both rear wheels would lock to bring about an extremely dangerous situation.

OBJECT AND SUMMARY OF THE INVENTION

It is an object of this invention to provide a method for antiskid control of a vehicle wherein the operating condition of a two-channel type antiskid control device is arranged to be shiftable according to the road surface condition in such a manner that, in the event of a split road surface, the braking force is maintained as much as possible on some of wheels that remain sufficiently adherent to the road surface, so that the braking distance can be prevented from lengthening without losing the maneuverability of the vehicle.

It is another object of this invention to provide an antiskid control method wherein signals are generated always through comparison of the velocity values of two wheels, and, in case one of the rear wheels comes to lock, the remaining three wheels are kept under control by virtue of the arrangement to individually control two brake fluid pressure channels, so that the safety of a vehicle can be enhanced.

To attain this object, in a four-wheel vehicle having brake fluid pressure piping divided into a first channel for right front and left rear wheels, and a second channel for left front and right rear wheels, a pressure reducing device provided for antiskid control in each of the two channels; a pressure reducing valve disposed in a fluid pressure transmission line leading to the rear wheel in each of the first and second channels; and a control circuit arranged to render the pressure reducing devices operative according to a sudden drop in the wheel velocity which results from brake application, an antiskid control method according to this invention is arranged such that: the pressure reducing device of each channel is operated with a signal selected as a reference signal, in the following mode (a) or (b), from among signal representing wheel velocity values detected from the four wheels:

(a) When the vehicle is running on a road surface of a low coefficient of friction on which the deceleration of the vehicle is low during brake application, a signal representing the velocity of a wheel rotating at a lower velocity is selected as the reference signal with the velocity values of front and rear wheels of each of the channels compared with each other (a mode of selecting lower velocity for each channel).

(b) When the vehicle is running on a road surface which is not of a low coefficient of friction, signals representing the velocity values of the rear wheels of the two channels are compared with each other and a signal representing a higher rear wheel velocity is selected. Then, the higher rear wheel velocity signal selected is further compared with signals representing the velocity values of the front wheels of the two channels; and a signal representing a lower wheel velocity is selected (a mode of selecting a signal by comparing a higher rear wheel velocity representing signal with signals representing velocity values of front wheels of the two channels).

In accordance with this invention, the condition of the road surface on which the vehicle is running may be detected by known means such as a deceleration sensor of the kind arranged to compare the value of deceleration resulting from brake application with a preset value.

Further, in accordance with this invention, the selection of signals representing the velocity of wheels may be performed, for example, by passing through either a low voltage detection circuit or a high voltage detection circuit, two wheel velocity signals obtained by converting wheel velocity values into voltage values.

The above and further objects and features of the invention will become apparent from the following detailed description of a preferred embodiment thereof taken in connection with the accompanying drawings.

BRIEF DESCRIPTION OF THE DRAWINGS

FIGS. 2(a) and 2(b) are block diagrams showing the antiskid control circuit of the same embodiment in a normal operation mode and in a switching mode, respectively.

DETAILED DESCRIPTION OF THE PREFERRED EMBODIMENT

Figure 1:
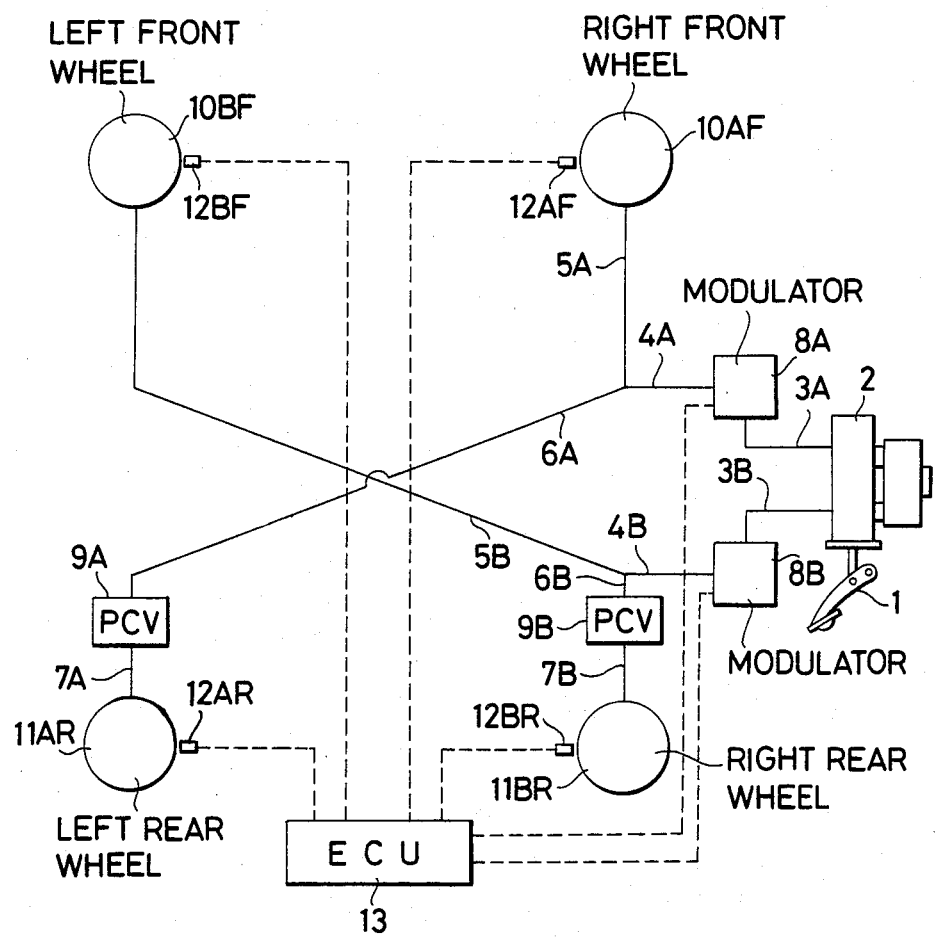
FIG. 1 is a schematic illustration showing, by way of example, the outline of piping of a brake fluid pressure system and an antiskid control device arranged in a vehicle according to the method of this invention.

FIG. 1 schematically shows a brake piping system and an antiskid control system of a vehicle to which the method of this invention is applied. The illustration includes a brake pedal 1 and a tandem type master cylinder 2. The master cylinder 2 is provided with two fluid pressure generating chambers which have the fluid pressure transmission lines 3A and 3B of first and second channels extending therefrom. These lines of the two channels are respectively divided into front and rear wheel lines via antiskid control pressure reducing devices 8A and 8B (hereinafter referred to as modulators). The front wheel lines are connected to the brake devices (not shown) of the front wheels 10AF and 10BF. The rear wheel lines are respectively connected to the brake devices (not shown) of the rear wheels 11AR and 11BR via proportioning valves 9A and 9B. Reference numerals 4, 5, 6 and 7 denote fluid pressure transmission lines while suffix symbols A and B respectively denote the first and second channels.

The modulators 8A and 8B are respectively arranged to be normally open to permit passage of the brake fluid. Each of them operates to shut off communication between the master cylinder and the brake device in response to an instruction issued from an antiskid control circuit. Further each of them is arranged to lower a braking force by reducing brake fluid pressure on the brake device for the restoration of the rotation of the wheel. In this instance, the modulator 8A operates for the right front and left rear wheels of the first channel in common while the other modulator 8B is arranged to operate for the left front and right rear wheels of the second channel in common.

Speed sensors 12AF, 12AR, 12BF and 12BR are respectively attached to the four wheels of the vehicle. A velocity or speed signal representing the velocity value of the wheel detected by each of these speed sensors is supplied to the antiskid control circuit (ECU) 13. The control circuit 13 produces the above-stated instruction to each of the modulators 8A and 8B according to a sudden drop of the wheel velocity which results from brake application to the vehicle. The control circuit 13 is arranged to perform a control operation according to a known method and with a known circuitry to accomplish control over detection of the sudden drop in the wheel velocity, detection of restoration of the wheel velocity and a timing for issuance of a modulator operating instruction signal on the basis of the result of such detection. Meanwhile, it is a feature of this embodiment of the invention to have the wheel speed control signal, which are required for such control selected through arrangement, made in a manner as shown in a block diagram in FIG. 2.

Referring to FIG. 2, frequency signals obtained from the speed sensors 12AF, 12AR, 12BF and 12BR of the wheels are respectively converted into voltage signals by frequency-to-voltage converters 14 (or F-V converters for short). These F-V converters 14 are followed by a select high circuit 15 for the rear wheels, a first select low circuit 16A for the first channel and a second select low circuit 16B for the second channel. Change-over switches 17A and 17B are arranged to allow the speed signals obtained via the F-V converters 14 from the rear wheel speed sensors to be supplied either via the above-stated select high circuit 15 or directly to the first and second select low circuits.

The change-over switches 17A and 17B are normally in the mode of supplying the rear wheel speed signals directly to the first and second select low circuit 16A and 16B without passing them through the select high circuit 15 as shown in FIG. 2(a). In the event of a detecting operation performed by a deceleration sensor 18 (G sensor), these switches 17A and 17B are switched over to another mode, in which the rear wheel speed signals are allowed to be supplied via the select high circuit to the select low circuits, respectively.

Each of the first and second select low circuits 16A and 16B is arranged to receive two input signals. One of the two input signals, which is representing a lower wheel speed than the other, is selected by each of the circuits 16A and 16B. The signals thus selected are supplied to logic circuits 19A and 19B of the next stage and the modulators 8A and 8B are operated thereby to control their respective channels.

Figure 2B:
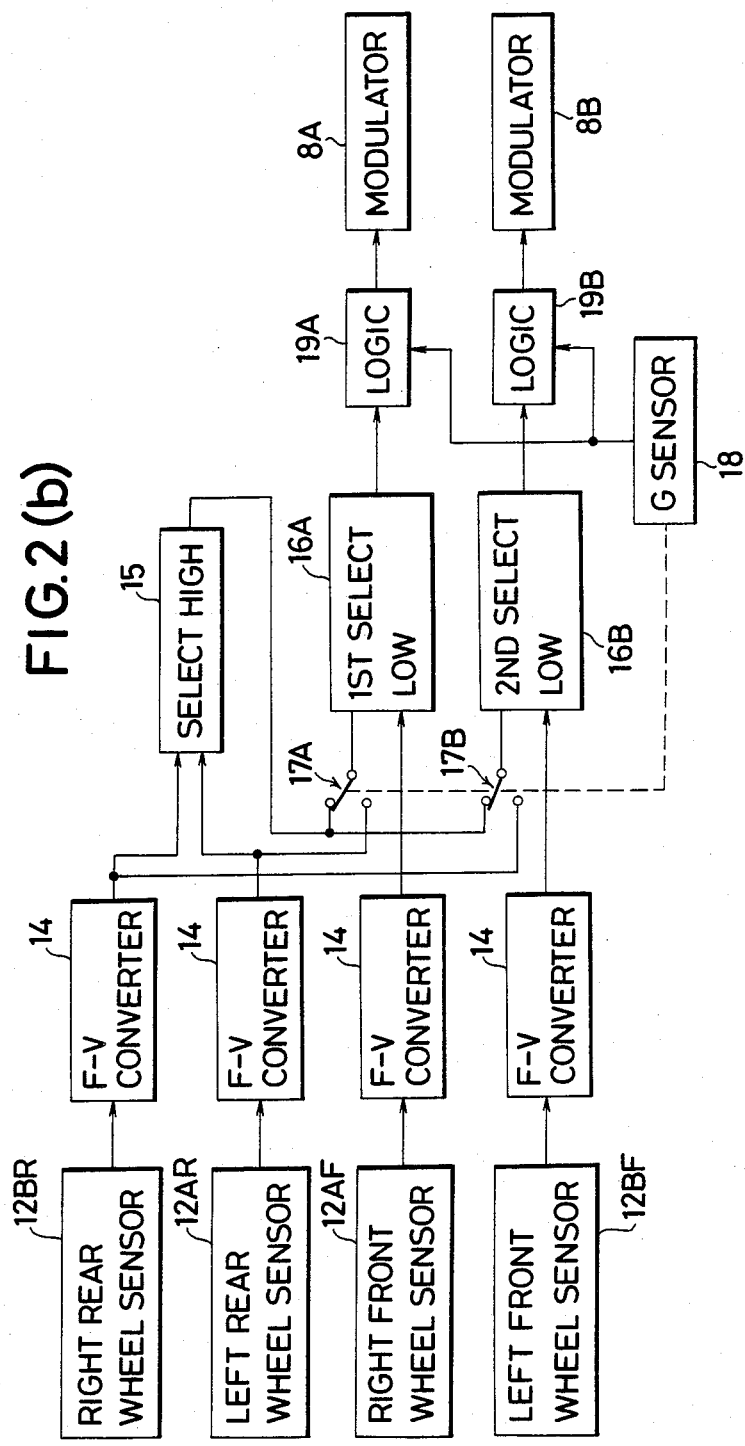

In this specific embodiment, the output of the deceleration sensor 18 (G sensor) is arranged to be supplied also to the logic circuits 19A and 19B when it is applied to the change-over switches to shift their positions. With the output of the sensor 18 arranged in this manner, the operation of the modulators 8A and 8B are controlled according to the normal mode of the switches 17A and 17B as shown in FIG. 2(a) and the change-over mode as shown in FIG. 2(b), so that reduction in the brake fluid pressure and reapplication thereof can be oppositely carried out.

The deceleration sensor 18 is, for example, of the weight pendulum type and is arranged to operate the change-over switches 17A and 17B when the degree of deceleration, which takes place during brake application, is below a predetermined value, that is, when the coefficient of friction of the road surface is extremely low.

A vehicle provided with the antiskid control circuit which is arranged in the manner as described above is controlled in the following manner:

During a normal operation of the circuit, the change-over switches 17A and 17B are in the positions as shown in FIG. 2(a). Therefore, in each of the channels, the signal selection is performed in a select low manner between the signals representing the speeds of the front and rear wheels. Antiskid control is then carried out on the basis of the signals thus selected. In other words, the antiskid control is performed over all the wheels when the vehicle is running on a road surface of a low coefficient of friction, so that a suitable degree of slippage can be maintained between the road surface and the wheels.

In case that the vehicle is running on a road surface which is not of a low coefficient of friction, the control circuit is in an operating mode which is as shown in FIG. 2(b). The speed signals from the left and right rear wheels come through a select high circuit 15 and one of the signals representing a higher rear wheel speed is selected. The higher speed signal thus selected is supplied to the first and second select low circuits 16A and 16B of the two channels as one of the two inputs of these circuits.

Therefore, assuming that the speed of the left rear wheel 11AR is higher than that of the right rear wheel 11BR, the select high circuit 15 selects the wheel speed signal which comes from the left rear wheel 11AR. Hereinafter, "S" will be prefixed to the symbol of each applicable wheel to denote a signal representing the speed of the wheel. Thus, in this instance, a signal SAR is selected. Then, the first select low circuit 16A compares this signal SAR with a signal SAF which represent the speed of the right front wheel 10AF. The lower of the two wheel speed signals thus compared is then supplied to the logic circuit 19A, which makes a necessary decision for antiskid control on the basis of the signal thus received. Meanwhile, the second select low circuit 16B compares the above-stated signal SAR with a signal SBF representing the speed of the left front wheel 10BF. The lower of the two signals is selected.

Let us now assume that the vehicle is running on a split road surface while the control circuit is in the normal mode described above. Selection of the left rear wheel as rotating at a high speed by the select high circuit 15 indicates that the front and rear wheels 10AF and 11BR on the right-hand side are on a frozen part of the road surface. In this instance, the signals SAF and SAR representing the speeds of the right front and left rear wheels of the first channel are compared and the antiskid control of the first channel is performed on the basis of the signal SAF which represents the lower wheel speed and is selected through a select low process. In other words, since the right front wheel is apt to lock under that condition, the brake fluid pressure then begins to be reduced in the first channel. In the second channel on the other hand, the signals SBF and SAR from the left front and left rear wheels are compared and antiskid control of the second channel is performed on the basis of either of them whichever may be thus selected. However, under the above-stated condition, the left front and left rear wheels (on the left-hand side of the vehicle) remain sufficiently adherent to the road surface and, therefore, the antiskid control does not begin in the second channel in general.

In other words, when the vehicle is running on the above-stated split road surface, the brake fluid pressure in the first channel is alone reduced while that of the second channel is not reduced. The right front, left front and left rear wheels are allowed to rotate without being locked. Meanwhile, a locked state takes place at the right rear wheel. Since the brake fluid pressure for the left front wheel is not unnecessarily reduced, the brake distance of the vehicle can be prevented from being increased.

Although there takes place a locked state at the right rear wheel, no irregular swing of the vehicle takes place as any lateral force that affect the vehicle is sufficiently restricted by the alignment of wheels on the left side.

In this specific embodiment, the control is accomplished on the basis of analog signals. However, it goes without saying that these analog signals may be replaced with digital signals.

In a vehicle of the kind having modulators arranged individually for two channels of brake fluid pressure piping, the brake distance of the vehicle can be prevented from becoming longer during brake application in accordance with this invention.

I claim:

1. In a vehicle having brake fluid pressure piping divided into a first channel for right front and left rear wheels and a second channel for left front and right rear wheels, a pressure reducing device provided for antiskid control in each of said channels, a pressure reducing valve disposed in a fluid pressure transmission line leading to said rear wheel in each of said first and second channels, and a control circuit arranged to render said pressure reducing devices operative according to a sudden drop in the velocity of the wheels which results from brake application, an antiskid control method comprising determining whether the road surface is of a low or high coefficient of friction and controlling said pressure reducing device of each of said channels with a respective signal, selected as a reference signal in one of the following modes (a) or (b) chosen on the basis on said determination, from among signals representing wheel velocity values detected from said four wheels, wherein:

mode (a) comprises, when the vehicle is running on a road surface of a low coefficient of friction on which the deceleration of the vehicle becomes low during brake application, selecting respective signals, each representing the velocity of a wheel rotating at a lower velocity, as the reference signal by comparing the velocity values of said front and rear wheels of each of said channels with each other; and mode (b) comprises, when the vehicle is running on a road surface which is not of a low coefficient of friction, comparing signals representing the velocity values of said rear wheels of said two channels with each other, selecting the signal representing the higher rear wheel velocity, comparing the higher rear wheel velocity signal with signals representing the velocity values of said front wheels of said two channels, and selecting respective signals for said respective pressure reducing devices which represent a lower wheel velocity, respectively, among said signals compared.

2. An antiskid control method according to claim 1, wherein, when the vehicle is running on the road surface of the low friction coefficient causing a decrease in the deceleration of the vehicle which takes place during brake application, the wheel velocity signals representing the velocity values of the rear wheels of said channels are supplied directly to first and second select low circuits; these signals are compared with signals representing the velocity values of the front wheels of said channels to select signals representing the lower velocity among these signals; and the pressure reducing devices of these channels are operated on the basis of the signals thus selected.

3. An antiskid control method according to claim 1, wherein, when the vehicle is running on the road surface which is not of the low friction coefficient, the wheel velocity signals from said rear wheels are supplied to a select high circuit to select one of them representing the higher velocity; the selected signal is supplied to first and second select low circuits to be compared therewith the wheel velocity signals from the front wheels of said channels and the signals representing the lower velocity are selected among these signals; and said pressure reducing devices of these channels are operated on the basis of the signals thus selected.

4. An antiskid control method according to claim 1, wherein the friction coefficient of the road surface on which the vehicle is running is detected by means of a deceleration sensor which is arranged to compare deceleration resulting from brake application with a predetermined setting value; and, in case that the road surface is not of the low friction coefficient, a changeover switch operates to allow the wheel velocity signals from said rear wheels to be supplied via a select high circuit to first and second select low circuits.

5. An antiskid control method according to claim 1, wherein selection of said wheel velocity signal is accomplished by supplying either a low voltage detection circuit or a high voltage detection circuit with two wheel velocity signals which have been converted into voltage signals by frequency-to-voltage (or F-V) converters.

6. In a vehicle having brake fluid pressure piping divided into a first channel for right front and left rear wheels and a second channel for left front and right rear wheels, a pressure reducing device provided for antiskid control in each of said channels, a pressure reducing valve disposed in a fluid pressure transmission line leading to said rear wheel in each of said first and second channels and a control circuit arranged to cause said pressure reducing devices to operate according to a sudden drop in the velocity of the wheels resulting from brake application, an antiskid control method comprising operating said pressure reducing device of each of said channels by comparing two wheel velocity signals representing the velocity values of the rear wheels of said two channels, selecting one of said signals representing a higher velocity value; comparing said rear wheel velocity signal thus selected with each of the wheel velocity signals representing velocity values of the front wheels of said channels, selecting the respective signals representing lower velocity values of said channel for operating said pressure reducing devices of said channels, respectively.

* * * * *